United States Patent Office 3,787,490
Patented Jan. 22, 1974

3,787,490
METHOD FOR PREPARING SUBSTITUTED DITHIOBIURETS
James Zielinski, Kenilworth, N.J., assignor to Esso Research and Engineering Company
No Drawing. Continuation-in-part of applications Ser. No. 732,858, May 29, 1968, and Ser. No. 821,975, May 5, 1969. This application Nov. 5, 1970, Ser. No. 87,301
Int. Cl. C07c *157/02*
U.S. Cl. 260—552 R  2 Claims

ABSTRACT OF THE DISCLOSURE

This invention relates to various methods for preparing 1,1,5,5-tetrasubstituted-3-substituted amino dithiobiurets and for preparing other pentasubstituted dithiobiurets. In one embodiment, the method comprises the steps of preparing 1,1,5,5-tetrasubstituted-3-disubstituted amino dithiobiurets characterized by the following formula:

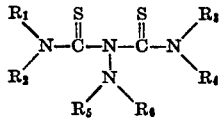

wherein $R_1$ to $R_6$ can be hydrogen or $C_1$–$C_3$ alkyl, said method comprising the step of reacting an unsymmetrical $C_1$–$C_3$ disubstituted hydrazine, said hydrazine being present in excess, with $C_1$ to $C_3$ disubstituted thiocarbamoyl chlorides in the presence of water under suitable reaction conditions.

A second embodiment involves preparing 1,1,5,5-tetrasubstituted-3-disubstituted amino dithiobiurets characterized by the formula:

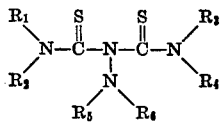

wherein $R_1$–$R_6$ is a $C_1$ to $C_{10}$ hydrocarbyl group, said group including (1) saturated or unsaturated acyclic or cyclic, aliphatics such as e.g. ethyl propargyl, cyclohexyl, cyclohexenyl, etc. and (2) aromatic or hetero-aromatic radicals, such as phenyl, pyridyl, etc. said method comprising the step of reacting either a semicarbazide, thiosemicarbazide or an unsymmetrical disubstituted hydrazine with thiocarbamoyl chloride in the presence of a trialkyl amine dissolved in a polar aprotic solvent having a pKa in the range of from 3 to 45.

A third embodiment involves a method for preparing other pentasubstituted dithiobiurets characterized by the following formula:

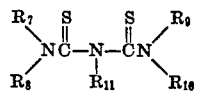

wherein $R_7$–$R_{11}$ can be the same or different and are $C_1$–$C_{10}$ alkyl, $C_6$–$C_{10}$ cycloalkyl, aralkyl, alkylthioalkyl, alkoxythioalkyl, alkylaminoalkyl and aromatic or heteroaromatic radicals such as phenyl pyridyl, etc. $R_7$–$R_{11}$ may totally add up to 5 to 50 carbon atoms.

This application is a continuation-in-part of copending U.S. Ser. No. 732,858 filed on May 29, 1968 in the name of James Zielinski relating to "Pesticidal Semicarbazide and Biuret Derivatives" and of copending application, Ser. No. 821,975, filed on May 5, 1969, now abandoned in the name of James Zielinski relating to "Semicarbazides and Biuret Derivatives and Their Use as Agricultural Pesticides and Animal Health Agents."

This invention relates to a process for preparing substituted dithiobiurets. In one aspect, this invention relates to a method for preparing 1,1,5,5-tetrasubstituted-3-disubstituted amino dithiobiurets. In another aspect, this invention relates to a method for preparing 1,1,5,5-tetramethyl-3-dimethyl amino dithiobiuret. In yet another aspect, this invention relates to a method for preparing pentasubstituted dithiobiurets.

It is to be noted that several substituted dithiobiurets are known under the prior art. For example, U.S. Pat. 3,092,484 discloses compounds having the formula

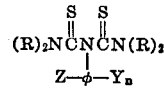

where R is $C_1$ to $C_4$ alkyl, Z is H, $NO_2$ or $C_1$–$C_4$ alkyl, Y is H or halogen, $n$ is 1 to 3, and their use as herbicides. Moreover, German Pat. 859,150 discloses compounds of the formula:

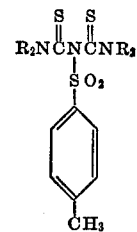

where $R_2$ is $CH_3$ or $C_2H_5$, or cycloalkyl such as penta- or tetramethylene, which compounds are known as vulcanizing accelerators. Disclosed, furthermore, in U.S. Pat. 2,704,244 are compounds of the general formula:

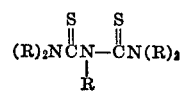

wherein R is given as hydrocarbyl.

The preparation of pentasubstituted dithiobiurets with an aromatic moiety (U.S. Pat. 3,092,484) or an aromatic sulfonyl moiety (Ger. 859,150) is a straightforward reaction of aromatic or aromatic sulfonyl isocyanate with a tetrasubstituted thiuram monosulfide. Non-aromatic isocyanates will not react. Thus obtention of 3-non-aromatic substituted 1,1,5,5-tetrasubstituted dithiobiurets is not feasible by the method described. The pentasubstituted compounds of U.S. Pat. 2,704,244 were never prepared although several mono thru tetrasubstituted materials were. Although disclosed and claimed in that patent as being prepared; literature, both patent and journals show that until this invention no one has prepared 3-non-aromatic substituted 1,1,5,5-tetrasubstituted dithiobiurets in which the 3-nitrogen was linked directly to a carbon atom.

Therefore, it is an object of the present invention to obtain substituted dithiobiurets in high yields and purity.

The present invention provides therefore a process for preparing 1,1,5,5-tetrasubstituted-3-disubstituted amino dithiobiurets which comprises reacting an unsymmetrical disubstituted hydrazine, said hydrazine being present in excess, with a disubstituted thiocarbamoyl chloride in the presence of water under suitable reaction conditions.

In the event that the reactants are insoluble in water, then the reaction must be carried out in the presence of a trialkylamine dissolved in a polar aprotic solvent.

In another embodiment, pentasubstituted dithiobiurets are prepared by reacting a 1,1,3-trisubstituted thiourea with a disubstituted thiocarbamoyl chloride in the presence of a trialkylamine dissolved in a polar aprotic solvent.

The term "unsymmetrical hydrazine" employed herein can be represented by the following formula:

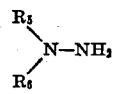

wherein $R_5$ and $R_6$ are as defined above.

Examples of suitable hydrazines include but are not limited to alkyl and aryl hydrazines and are:

Hydrazines

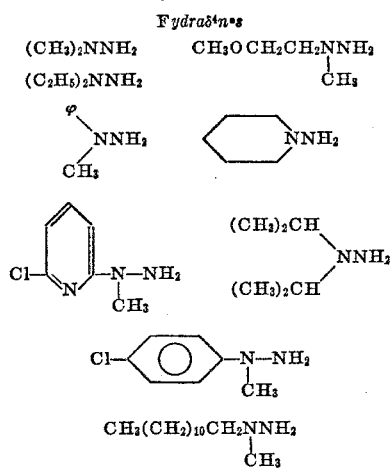

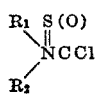

The carbamoyl or thiocarbamoyl chloride reactant employed in the process of the present invention is represented by the following formula:

$$\begin{array}{c} R_1 \quad S(O) \\ \diagdown \quad \parallel \\ NCCl \\ \diagup \\ R_2 \end{array}$$

wherein $R_1$–$R_2$ are defined as hereinabove.

Examples of suitable carbamoyl and thiocarbamoyl chlorides are as follows:

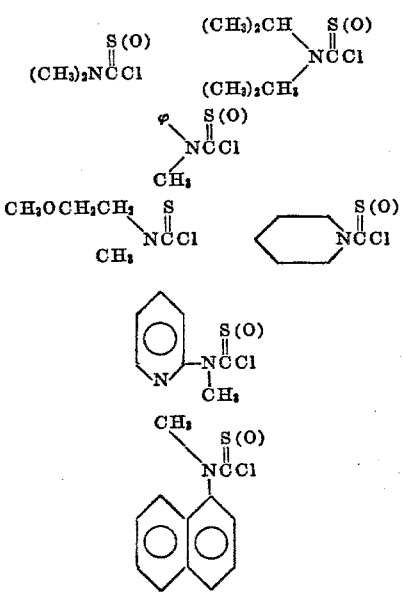

The thiocarbamoyl chloride reactants can be prepared by well known methods such as those disclosed in "Organic Syntheses," Vol. 4, page 307 (1963); A. L. Birkofer and K. Krebs, Tetrahedron Letters, Vol. 885 (1968), etc. The hydrazine reactant is readily available commercially or can be prepared by a variety of conventional methods as, for example, shown in "Organic Syntheses," Vol. II, page 211 (1943).

When $R_5$ and $R_6$ are not hydrogen, the hydrazine can be prepared by the technique shown in an article by R. T. Beltrami and E. R. Bissell, Vol. 78, 2467 (1956).

The solvent for this method is preferably water, however when the thiocarbamoyl chloride or the hydrazine are insoluble in water, then the solvent must be a trialkylamine dissolved in a suitable aprotic solvent having a pKa between about 3 and 45 (i.e. ±1 pKa units) based on the MSAD scale (D. J. Cram, "Fundamentals of Carbonion Chemistry," Academic Press, New York, 1965, p. 19).

Suitable trialkylamines are as follows: triethylenediamine, N,N-dimethylaniline, N,N-diethyl cyclohexyl amine, N,N'-diethyl-1,3-propanediamine, N,N'-dimethyl-1,6-hexanediamine, N,N,N',N'-tetraethylethylene-diamine, triethylamine.

Suitable solvents falling within the appropriate pKa range are as follows: tetrahydrofuran, acetonitrile, dimethylformamide, nitromethane, nitrobenzene, chloroform, acetone, toluene, dichloromethane.

The reaction is usually carried out in a temperature ranging from 0 to 150° C. preferably from 10 to 50 and under pressures from 1 to 5 atmospheres, preferably from 0.8 to 1.5.

The molar ratio of carbamoyl or thiocarbamoyl to hydrazine ranges from 2 to 3 up to 1 to 25 and preferably from 1 to 3.

In lieu of a hydrazine, the carbamoyl or thiocarbamoyl chloride can be reacted with a semicarbazide or thiosemicarbazide in the presence of a trialkylamine in accordance with the following equation:

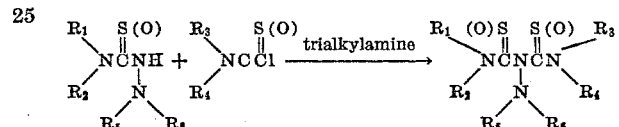

where $R_1$ to $R_6$ are as previously defined.

The semicarbazides and thiosemicarbazides useful in this method are described in the copending applications referred to hereunder.

This invention also includes a method for preparing pentasubstituted dithiobiurets characterized by the following formula:

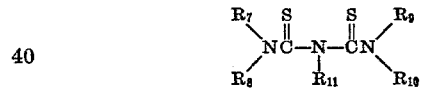

wherein $R_7$, $R_8$, $R_9$, $R_{10}$ and $R_{11}$ can be the same or different and are $C_1$–$C_{10}$ alkyl, $C_6$–$C_{10}$ cycloalkyl, aralkyl, alkylthioalkyl, alkoxythioalkyl, alkylaminoakyl and aromatic and heteroaromatic radicals such as phenyl, pyridyl, etc. $R_7$, $R_8$, $R_9$, $R_{10}$ and $R_{11}$ may in total contain from 5 to 50 carbon atoms.

This method comprises reacting a 1,1,3-trisubstituted thiourea with a thiocarbamoyl chloride in the presence of a trialkyl amine dissolved in a polar aprotic solvent.

The solvent system and the thiocarbamoyl chloride reactants are the same as described hereinabove. The 1,1,3-trisubstituted thiourea useful in this reaction can be prepared, Synthetic Organic chemistry by Wagner and Zook, John Wiley and Sons, Inc., 1953.

In this reaction the preferred solvents are the same as for the method described hereinabove, the molar ratios of reactants range thiosemicarbazide to thiocarbamoyl to base range from 1:1:1 up to 1:3:3 and preferably from 1:1 to 2. The temperature of the reaction is carried out ranging from 0 to 200° C., preferably from 10 to 50, and under a pressure of from 1 to 20 atmospheres, preferably from 0.8 to 1.5. The preferred bases are trisubstituted amines such as diaza bicyclo-2,2,2-octane, N,N-dimethylaniline, N,N-dimethylaminocyclohexane, triethylamine, N,N'-diethyl-1,3-propane diamine, N,N'-dimethyl-1,6-hexanediamine, N,N,N',N'-tetraethylethylenediamine.

The preferred dithiobiuret compounds of this invention are characterized generally by one of the following formulae:

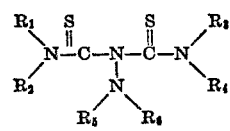

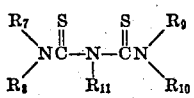

wherein $R_1$ to $R_6$ can be hydrogen or $C_1$–$C_3$ alkyl, said method comprising the step of reacting unsymmetrical $C_1$–$C_3$ disubstituted hydrazine, said hydrazine being present in excess, with $C_1$ to $C_3$ disubstituted thiocarbamoyl chlorides in the presence of water under suitable reaction conditions, and wherein $R_7$–$R_{11}$ can be the same and are $C_1$–$C_{10}$ alkyl, $C_6$–$C_{10}$ cycloalkyl, aralkyl, alkylthioalkyl, alkoxythioalkyl, alkylaminoalkyl.

Typical preferred monothiobiurets or dithiobiurets illustrative of the foregoing general formula include:

1,1-dimethyl-3-diallylamino-5,5-pentamethylene monothiobiuret or dithiobiuret;
1,1,5,5-tetramethyl-3-N-thiomorpholino monothiobiuret or dithiobiuret;
1,5-dimethyl-1,5-diethyl-3-N-methyl-4-chloroanilino-2-thiobiuret;
1-(2-ethoxyethyl)-1-methyl-3-dipropargyl-amino-5,5-pentamethylene monothiobiuret or dithiobiuret;
1,1,5,5-tetramethyl-3-dimethylamino monothiobiuret or dithiobiuret;
1,1,5,5-tetramethyl-3-pentamethyleneamino monothiobiuret or dithiobiuret;
1,1,5,5-tetraethyl-3-dimethylamino monothiobiuret or dithiobiuret;
1,1,5,5-tetramethyl-3-diethylamino monothiobiuret or dithiobiuret;
1,1-dimethyl-3-dimethylamino-5,5-diethyl monothiobiuret or dithiobiuret;
1,1,5,5-tetraethyl-3-pentamethylene-amino monothiobiuret or dithiobiuret,
1,1,5,5-tetraethyl-3-hexamethylamino monothiobiuret or dithiobiuret;
1,1,5,5-tetramethyl-3-hexamethyleneamino monothiobiuret or dithiobiuret;
1,1,5,5-tetramethyl-3-di-n-propylamino monothiobiuret or dithiobiuret;
1,1,5,5-tetraethyl-3-diethylamino dithiobiuret;
1,1,5,5-tetramethyl-3-dimethylamino-2-thiobiuret;
1-dodecyl-1,5,5-trimethyl-3-dimethylamino monothiobiuret or dithiobiuret;
1,1-dimethyl-3-N-methyldodecylamino-5,5-diethyl monothiobiuret or dithiobiuret; etc.

Suitable pentasubstituted dithiobiurets are as follows:

1,1,5,5-tetramethyl-3-isopropyl dithiobiuret
1,5-diphenyl-1,3,5-trimethyl dithiobiuret
1,1,3,5-tetraethyl-5-isopropyl dithiobiuret
1,3,5-tributyl-1,5-di-(p-chlorophenyl) dithiobiuret
1,1,3,5,5-pentamethyl dithiobiuret
1,1,5,5-tetrapropyl-3-methyl dithiobiuret The present invention can be further described by reference to the following examples. It is to be understood however that the examples are for purpose of illustration only and are not intended to limit the scope of the present invention in any respect.

Example 1—Preparation of 1,1,5,5-tetramethyl-3-dimethylaminodithiobiuret

To a stirred solution of 135 g. (2.25 mole) of unsymmetrical-dimethylhydrazine in 400 ml. of water was added in portions 92.7 g. (0.75 mole) of solid dimethylthiocarbamoyl chloride. The temperature rose to 32° C. and as the addition progressed a yellow solid deposited. When the addition was complete the temperature remained at 32° C. for one hour and the suspension was allowed to stir for an additional 48 hours. The mixture was filtered and the yellow solid was washed with water. The solid was allowed to air dry to yield 54.7 g. (61.5%) of the dithiobiuret. A sample was recrystallized from ethanol three times to yield a white solid which turned pale yellow on exposure to air, M.P. 107–107.5° C.

*Elemental analysis.*—Calculated for $C_8H_{18}N_4S_2$ (percent): C, 40.99; H, 7.74; N, 23.90; S, 27.36. Found (percent): C, 40.66; H, 7.58; N, 23.63; S, 27.75.

When this reaction was run in other solvents such as tetrahydrofuran, benzene, etc., the yields were much lower, 30 to 50%, and the product was highly contaminated by thiosemicarbazide. The following compounds were also prepared by this method.

| Compound | Yield, percent | M.P., degrees | Calculated C | H | N | S | Found C | H | N | S |
|---|---|---|---|---|---|---|---|---|---|---|
| (CH₃)₂NC(S)NC(S)N(CH₃)₂, N(C₂H₅)₂ | 48 | 66–67.5 | 45.76 | 8.45 | 21.35 | 24.44 | 45.53 | 8.17 | 21.04 | 24.97 |
| (C₂H₅)₂NC(S)NC(S)N(C₂H₅)₂, N(CH₃)₂ | 59 | 90–91 | 49.71 | 9.02 | 19.29 | 22.08 | 49.95 | 9.24 | 19.17 | 22.49 |
| (CH₃)₂NC(S)NC(S)N(CH₃)₂, N–(CH₂)₅ | 65 | 124–125 | 48.14 | 8.08 | 20.42 | 23.37 | 48.90 | 7.98 | 20.24 | 23.90 |
| (C₂H₅)₂NC(S)NC(S)N(C₂H₅)₂, N–(CH₂)₅ | 56 | 63–64.5 | 54.50 | 9.15 | 16.95 | 19.40 | 53.59 | 9.53 | 18.87 | 19.33 |
| (CH₃)₂NC(S)NC(S)N(CH₃)₂, N–(CH₂)₆ | 37 | 115–116 | 49.96 | 8.39 | 19.42 | 22.23 | 50.02 | 9.01 | 19.65 | 22.22 |
| (C₂H₅)₂NC(S)NC(S)N(C₂H₅)₂, N–(CH₂)₆ | 23 | 66.5–68 | 55.77 | 9.36 | 16.26 | 18.61 | 55.59 | 9.54 | 16.81 | ........ |

The advantages of employing water as a solvent are that the biuret derivative product is water insoluble and can be removed in high purity by simple filtration and the semicarbazide forms in small amounts and is water soluble; therefore, it does not contaminate the product.

Yields of 75 to 85% are obtained with the product being 95% pure when all of the substituent groups are methyl or hydrogen. As the molecular weight increases, the yields decrease but purity is still high.

Example 2.—Preparation of 1,1-dimethyl-5,5-diethyl-3-dimethylamino dithiobiuret

A solution of 14.7 grams (0.1 mole) of 1,1,4,4-tetramethyl thiosemicarbazide; 15.2 grams (0.1 mole) of diethylthiocarbamoyl chloride; 11.2 grams (0.1 mole) of triethylenediamine (1,4-diazo bicyclo 2,2,2-octane) in 50 ml. of acetonitrile was allowed to stir overnight at room temperature. The reaction mixture was filtered and the acetonitrile solution was cooled to yield 13.6 grams (52%) of the dithiobiuret as pale yellow crystals, M.P. 105–106.5° C.

Elemental analysis.—Calculated for $C_{10}H_{22}N_4S_2$ (percent): C, 45.7; H, 8.38; N, 21.37; S, 24.43. Found (percent): C, 45.9; H, 8.20; N, 21.33; S, 23.90.

Example 3.—1,1,5,5-tetramethyl-3-N-ethylanilino dithiobiuret

Dimethylthiocarbamoyl chloride (1235 g., 10.0 mols) was added in two portions to a solution of 1-phenyl-1-methylhydrazine (611 g., 5.0 mols), triethylamine (1111 g., 11.0 mols) in 5 l. acetonitrile. The mixture was allowed to stir for 72 hours, filtered to remove triethylamine hydrochloride and evaporated in vacuo to give a yellow solid which was triturated with water, dried and further washed with hot methanol and recrystallization from methanol to give 1156 g. (78%) of 1,1,5,5-tetramethyl-3(N-methylanilino) dithiobiuret, M.P. 145.5–146.5° C. The structure was confirmed by NMR.

Analysis.—Calcd. for $C_{13}H_{20}N_4S_2$ (percent): C, 52.7; H, 6.76; N, 18.9; S, 21.6. Found (percent): C, 52.34; H, 6.90; N, 18.71; S, 21.62.

Example 4.—1,1-dimethyl-3-dimethylamino-5-ethyl-5-cyclohexyl dithiobiuret 1,1,4,4-tetramethyl thiosemicarbazide (272 g., 1.85 mols), N-ethyl-N-cyclohexyl thiocarbamoyl chloride (380 g., 1.85 mols) and DABCO (208 g., 1.85 mols) were combined in 2.5 l. of acetonitrile and allowed to stir at room temperature for 48 hours. The suspension was filtered and the solvent removed in vacuo to yield a dark brown oil which was redissolved in chloroform and washed with 5% HCl and with water, dried (MgSO$_4$), filtered and evaporated in vacuo to give a brown oil. The oil was dissolved in ethanol and cooled overnight. The yellow solids (disulfide) were filtered and discarded. The ethanol was removed in vacuo and the oil redissolved in acetone and cooled overnight. Very large grey-yellow crystals formed which were collected by filtration giving 124 g. 21%; M.P. 121–124°. The structure was confirmed by NMR.

Analysis.—Calcd. for $C_{14}H_{28}N_4S_2$ (percent): C, 53.12; H, 8.92; N, 17.70; S, 20.26. Found (percent): C, 53.32; H, 9.35; N, 17.96; S, 20.21.

Example 5.—1,1-dimethyl-3-dimethylamino-5-ethyl-5-phenyl dithiobiuret 1,1,4,4-tetramethyl thiosemicarbazide (294 g., 2.0 mol), N-methyl-N-phenyl thiocarbamoyl chloride (396 g., 2.0 mol) and DABCO (224 g., 2.0 mol) were combined in 2 l. CHCl$_3$ and allowed to stir for 48 hours. One liter of 5% HCl was added and the chloroform layer collected and washed with water, dried (MgSO$_4$), filtered and evaporated in vacuo to give a tan semisolid which was recrystallized from methanol to give 322 g. (52%) of 1,1-dimethyl-3-dimethylamino-5-ethyl-5-phenyldithiobiuret, M.P. 79–82°. The structure was confirmed by NMR.

Analysis.—Calcd. for $C_{14}H_{22}N_4S_2$ (percent): C, 54.13; H, 7.14; N, 18.04; S, 20.66. Found (percent): C, 54.59; H, 7.47; N, 18.00; S, 20.16.

Example 6.—1,1,5,5-tetramethyl-3-isopropyl dithiobiuret 1,1-dimethyl-3-isopropyl thiourea (12.2 g., 0.08 mol), dimethyl thiocarbamoyl chloride (10.3 g., 0.08 mol) and DABCO (9.5 g., 0.08 mol) were combined in 200 ml. acetonitrile and allowed to stir at room temperature for 48 hours. The suspension was filtered and the acetonitrile removed in vacuo to yield a yellow oil which was dissolved in chloroform and washed with 5% HCl and water, dried (MgSO$_4$), filtered and evaporated in vacuo to give a yellow oil. Distillation of the oil gave the title compound as a yellow oil 130–139° at 0.2 m. The oil solidified and was recrystallized from ethanol, M.P. 65–66.5°.

Analysis.—Calcd. for $C_9H_{19}N_3S_2$ (percent): C, 46.31; H, 8.21; N, 18.00; S, 27.48. Found (percent): C, 46.60; H, 8.35; N, 17.84; S, 27.89.

Other pentasubstituted dithiobiurets prepared according to the above example are as follows:

| Compound | Structure | M.P./B.P., degrees | Yield, percent | Calculated C | H | N | S | Found C | H | N | S |
|---|---|---|---|---|---|---|---|---|---|---|---|
| 1 | (CH$_3$)$_2$NC(S)N(CH$_3$)C(S)N(CH$_3$)$_2$ | [1] 149–152 | 92 | 40.94 | 7.36 | 20.46 | 31.23 | 41.21 | 7.08 | 20.26 | 31.04 |
| 2 | (nC$_3$H$_7$)$_2$NC(S)N(CH$_3$)C(S)N(nC$_3$H$_7$)$_2$ | 42–43 | 85 | 56.73 | 9.84 | 13.23 | 20.20 | 57.13 | 8.45 | 13.56 | 20.63 |
| 3 | (nC$_3$H$_7$)$_2$NC(S)N(CH$_3$)C(S)N(CH$_3$)$_2$ | [2] 158–160 | 45 | 50.53 | 8.86 | 16.07 | 24.53 | 51.29 | 8.90 | 16.34 | 23.18 |
| 4 | φN(CH$_3$)C(S)N(CH$_3$)C(S)N(CH$_3$)$_2$ | 99–102 | 35 | 53.89 | 6.41 | 15.71 | 23.98 | 53.91 | 6.13 | 15.70 | 23.26 |
| 5 | (CH$_3$)$_2$NC(S)N(CH(CH$_3$)$_2$)C(S)N(CH$_3$)$_2$ | 65–66.5 | 39 | 46.31 | 8.21 | 18.00 | 27.45 | 46.60 | 8.35 | 17.84 | 27.89 |

[1] At 0.3 minute. [2] At 0.15 minute.

What is claimed is:

1. A method for preparing penta-substituted dithiobiurets of the formula:

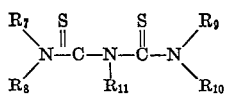

wherein $R_7$, $R_8$, $R_9$, $R_{10}$ and $R_{11}$ can be the same or different and are $C_{1-3}$ alkyl, said method comprising the steps of reacting a 1,1,3-trisubstituted thiourea with either a carbamoyl or thiocarbamoyl chloride in the presence of an amine selected from the group consisting of triethylenediamine, N,N-dimethylaniline, N,N-diethyl cyclohexyl amine, N,N'-diethyl-1,3-propanediamine, N,N'-dimethyl-1,6-hexanediamine, N,N,N',N'-tetraethyl ethylenediamine and triethylamine dissolved in a polar solvent having a pKa ranging from 3 to 45.

2. A process according to claim 1 wherein said solvent is one selected from the group consisting of tetrahydrofuran, dimethylformamide, acetonitrile.

References Cited
UNITED STATES PATENTS
3,000,940   9/1961   Raasch _____ 260—552 R OTHER REFERENCES
Jensen et al., Acta Chemica Scandinavica, vol. 22, No. 1, pp. 1, 37–38 (1968).

BERNARD HELFIN, Primary Examiner
M. W. GLYNN, Assistant Examiner

U.S. Cl. X.R.
260—241, 293.85, 294.8, 552 SC